United States Patent
Karlsson et al.

(10) Patent No.: US 12,219,372 B2
(45) Date of Patent: Feb. 4, 2025

(54) CELL CONFIGURATIONS IN A CELLULAR COMMUNICATION SYSTEM

(71) Applicant: Telefonaktiebolaget LM Ericsson (publ), Stockholm (SE)

(72) Inventors: Patrik Karlsson, Sollentuna (SE); Claes Tidestav, Bålsta (SE); Walter Müller, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 376 days.

(21) Appl. No.: 17/763,349

(22) PCT Filed: Oct. 7, 2019

(86) PCT No.: PCT/SE2019/050978
§ 371 (c)(1),
(2) Date: Mar. 24, 2022

(87) PCT Pub. No.: WO2021/071397
PCT Pub. Date: Apr. 15, 2021

(65) Prior Publication Data
US 2022/0377580 A1 Nov. 24, 2022

(51) Int. Cl.
*H04W 24/02* (2009.01)
*H04W 48/16* (2009.01)
*H04W 56/00* (2009.01)

(52) U.S. Cl.
CPC .......... *H04W 24/02* (2013.01); *H04W 48/16* (2013.01); *H04W 56/0015* (2013.01)

(58) Field of Classification Search
None
See application file for complete search history.

(56) References Cited

U.S. PATENT DOCUMENTS

| | | | |
|---|---|---|---|
| 2017/0105112 A1* | 4/2017 | Park | H04L 5/0035 |
| 2019/0159261 A1* | 5/2019 | Jung | H04W 72/542 |

FOREIGN PATENT DOCUMENTS

| | | |
|---|---|---|
| CN | 108390747 A | 8/2018 |
| EP | 2938133 A1 | 10/2015 |
| WO | 9638014 A1 | 11/1996 |

OTHER PUBLICATIONS

CATT, "Scenarios for intra-cell system information delivery", 3GPP TSG-RAN WG2 Meeting #96, Reno, USA, Nov. 14, 2016, pp. 1-5, R2-167958, 3GPP.

* cited by examiner

*Primary Examiner* — Frantz Bataille
(74) *Attorney, Agent, or Firm* — COATS & BENNETT, PLLC

(57) ABSTRACT

A method for arranging transmission of SSBs comprises transmitting (S1), from a first TRXP of a cellular telecommunication system, of first SSBs at a carrier. The first SSBs define a first cell. The first cell is unique for the first 5TRXP. The method further comprises transmitting (S2), from the first TRXP, of second SSBs at the carrier. The second SSBs define a second cell. The second cell is a combined cell of the first TRXP and at least one neighbouring, second TRXP. A method for cell assignment based on multiple SSBs is also disclosed, as well as TRXPs and network nodes for implementing the methods.

20 Claims, 12 Drawing Sheets

CELL CONFIGURATIONS IN A CELLULAR COMMUNICATION SYSTEM

TECHNICAL FIELD

The proposed technology generally relates in general to support of cell configuration in a cellular communication system, and in particular to support of seamless multi Transmission/Reception point mobility.

BACKGROUND

Handover is a fundamental function of mobile communication. Handover between two cells can in general be divided into different time phases. Examples of such phases can be e.g. network (NW) configuration of user equipment (UE), UE candidate search and evaluation, UE reporting to NW, target preparation, handover execution and handover completion. NW configuration of UE, UE reporting to NW and handover execution is typically performed by using radio resource control (RRC) signalling. However, handover execution besides RRC signalling may also include a random-access attempt to target to allow for time alignment adjustments of UE transmission time if needed.

Cells are typically realized by transmission and reception from only one transmission/reception point (TRXP). The transmission from a TRXP representing a cell according to a UE contains amongst other signals reference symbols according to a specification. These reference symbols allow the UE to detect, identify, measure and report cell candidates to NW, typically according to NW configured rules.

In order to increase handover robustness and avoid long interruption and packet loss due to handover execution there are several concepts described and discussed in $3^{rd}$ generation Partnership Project (3GPP). Dual Connectivity/Carrier Aggregation (DC/CA) based handover, conditional handover, "Make before break", Random Access Channel (RACH) less handover etc., are different approaches.

The legacy way in second generation (2G) and fourth generation (4G) to achieve seamless handover and robust handover is to let two or more TRXP transmit identical signals. This results in that the UE perceives it to be only one cell. From NW resource point of view, this configuration comprises two (or more) cells but which are configured to be identical. This concept is named "Combined Cell" for bi-directional transmission or Single Frequency Network (SFN) type of downlink (DL) only transmission which is used for multimedia broadcast/multicast service (MBMS).

Extra robustness is typically needed for transmission from cells that have the PCell and PSCell role, as configured by the NW for a UE in RRC connected mode. A drawback with "Combined Cell" for bi-directional transmission or SFN type of DL only transmission is, however, that it reduces the efficiency of the total available radio resources within the area covered by the "combined cell" or SFN DL.

Another important aspect of a mobile communication system is transmission selectivity. Being selective when transmitting to avoid disturbing other ongoing transmissions is a key property for achieving high capacity and optimal coverage in a cellular network with limited spectrum assets. To be selective, the NW need to get support from the UE to identify the best TRXP candidates to be used for DL transmissions to the UE's. Best TRXP candidates to be used for reception can also be selected based on UE support e.g. if the UE transmit an NW configured signal that the NW can evaluate as received at several TRXPs. This enables the NW to select which TRXP to use for reception.

New radio (NR) standard allows synchronization signals representing a cell, so-called Synchronization Signal Block (SSB), to be divided into several SSB beams, where each SSB beam can be identified by a UE extracting an SSB index from the transmitted signals. The selectivity can then be made also between individual ones of these beams. There is, however, a limitation for how many SSB indexes an SSB transmission can be divided into. The number depends on the orthogonal frequency-division multiple access (OFDMA) subcarriers spacing used for the transmission. Current UE support, specified for NR capable UE's, to detect and distinguish multiple TRXP's using SSB index within the same cell is limited to 4 SSB indexes per SSB transmission when the subcarrier spacing (SCS) is 15 kHz. A maximum of 4 SSB indexes allows only up to 4 beams to be uniquely identified by UE. 15 kHz is also the chosen 4G sub carrier spacing.

At the same time as the need for being selective and to get UE support for that, as described above, there is also a need to have transmission to the UE's that resembles the benefit of using the concept of "SFN combined cells" when needed.

SUMMARY

It is an object to enable improved cell configurations in a cellular communication system.

This and other objects are met by embodiments of the proposed technology.

According to a first aspect, there is provided a method for arranging transmission of SSBs. The method comprises transmitting, from a first TRXP of a cellular telecommunication system, of first SSBs at a carrier. The first SSBs define a first cell. The first cell is unique for the first TRXP. The method further comprises transmitting, from the first TRXP, of second SSBs at the carrier. The second SSBs define a second cell. The second cell is a combined cell of the first TRXP and at least one neighbouring, second TRXP.

According to a second aspect, there is provided a method for cell assignment. The method comprises selecting a cell intended for a UE out of at least a first cell and a second cell. The first cell is unique for a first TRXP. The second cell is a combined cell of the first TRXP and at least one neighbouring, second TRXP. The selected cell is assigned to the UE.

According to a third aspect, there is provided a TRXP configured to arrange transmission of SSBs. The TRXP is configured to transmit first SSBs at a carrier. The first SSBs define a first cell. The first cell is unique for the TRXP. The TRXP is configured to transmit second SSBs at the carrier. The second SSBs define a second cell. The second cell is a combined cell of the TRXP and at least one neighbouring, second TRXP.

According to a fourth aspect, there is provided a network node configured for cell assignment. The network node is configured to select a cell intended for a UE out of at least a first cell and a second cell. The first cell is unique for a first TRXP. The second cell is a combined cell of the first TRXP and at least one neighbouring, second TRXP. The network node is further configured to assign the selected cell to the UE.

According to a fifth aspect, there is provided a computer program comprising instructions, which when executed by at least one processor, cause the processor(s) to cause transmission of first SSBs at a carrier. The first SSBs define a first cell. The first cell is unique for the TRXP. The instructions, when executed by the processor(s), further cause the processor(s) to cause transmission of second SSBs at the carrier. The second SSBs define a second cell. The second cell is a combined cell of the TRXP and at least one neighbouring, second TRXP.

According to a sixth aspect, there is provided a computer program comprising instructions, which when executed by at least one processor, cause the processor(s) to select a cell intended for a UE out of at least a first cell and a second cell. The first cell is unique for a first TRXP. The second cell is a combined cell of the first TRXP and at least one neighbouring, second TRXP. The instructions, when executed by the processor(s), further cause the processor(s) to assign the selected cell to the UE According to a seventh aspect, there is provided a computer-program product comprising a computer-readable medium having stored thereon a computer program of the fifth and/or sixth aspect.

An advantage of the proposed technology is that this makes it possible for the NW to achieve a robust and seamless inter TRXP mobility for UEs for which this is preferred and at the same time achieve a TRXP unique high capacity transmission for UEs and services where this is preferred.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

One of the tasks is how to make a UE to perform a TRXP search, identification and reporting to support seamless multi TRXP mobility.

The existing prior-art solutions do not have any good support for allowing selective transmission and selective reception from many TRXP's within the same cell.

The proposed technology arranges the SSB transmissions from the TRXP's so that the UE's perceive an area to be covered by many small intra frequency cells and a few large intra or inter frequency related cells that covers the same area. The large cells are realized with an SSB transmission from all sites, which SSB transmission is identical. This allows the SSB transmission to be used as an "SFN Combined cell" type of transmission. Thus, as an example, this can be configured as a PCell for the UE's or as a PSCell for RRC connected UE's. In general, a cell transmission with "SFN Combined Cell" properties can be created.

In NR, the physical cell identity (PCI) is disclosed to the UE via a primary synchronization signal (PSS) and a secondary synchronization signal (SSS). The PSS can assume the values 0, 1, 2 and the SSS can independently assume the values 0, . . . , 335. In other words, by combining the PSS and the SSS values makes it possible for the UE to identify one out of 1008 SSB's/PCI's. Accordingly, the NW may use the SSB frequency and the PCI to identify different Cells/TRXP's.

Furthermore, by transmission of more than one SSB from a TRXP, more than one cell associated with the TRXP can be identified. These cells can be configured independently of each other. This means that by transmitting two different SSBs, a single TRXP can be associated with a cell that is unique for the TRXP in question, and at the same time be associated with a combined cell, common for the TRXP in question and one or more neighbouring cells.

Figure 1:
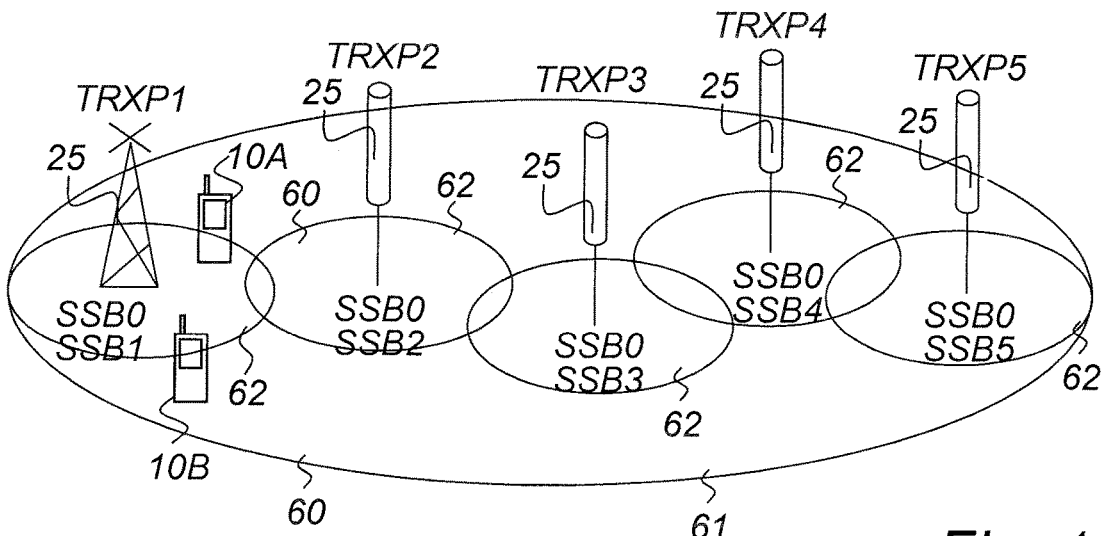
FIG. 1 is a schematic illustration of an embodiment of co-existing single-TRXP cells and multi-TRPX cells.

An example of a cell configuration is illustrated schematically in FIG. 1. Five TRXPs 25 are present within an area. Each TRXP 25 transmits a unique SSB; SSB1-SSB5, which defines a cell 62 that is associated with a single TRXP 25. In this example, all TRXPs 25 in the area can transmit an additional SSB, SSB0, thereby defining a combined cell 61 (or an SFN fashion cell).

In the area, the UEs 10A, 10B experiences that there are six cells 60; five single TRXP cells 62 and one combined cell 61. Preferably, the NW has configured SSB0 for a cell configured to be indicated as not available for idle or inactive mode camping to the UE's. In such an embodiment, the UE 10A, 10B will do cell reselection in idle/inactive mode only between SSB1-SSB5. Paging reception and initial Random Access attempts will typically also only be done using Cells 62 represented by SSB1-SSB5.

Once the UE and the NW have setup an RRC connection, the NW may or may not reconfigure the UE. Consider the first UE 10A in FIG. 1. The UE 10A detects signals comprising SSB0, SSB1 and weaker signals comprising SSB2. Since the SSB0 is configured not to be used for random access, an RRC connection is established with TRXP1 based on the SSB1. The UE 10A is more or less stationary but requires Mobile Broadband communication. The NW thereby chooses to let the UE 10A stay in the single TRXP cell 62 associated with TRXP1.

Another UE 10B is also connected to the TRXP1 based on the SSB1. The UE 10B only requires voice communication, i.e. the required band width is rather limited. However, the UE 10B is expected to move and requires a continuous connection without any interruptions. The NW may therefore select to handover the UE 10B to the combined cell 61 defined by the SSB0. This reduces the risks for disconnections during any repeated mobility related handover procedures.

From these examples, a method for cell assignment can be expressed. The method comprises selection of a cell intended for a UE out of at least a first cell and a second cell. The first cell is unique for a first TRXP. The second cell is a combined cell of the first TRXP and at least one neighbouring, second TRXP. The method further comprises assignment of the selected cell to the UE.

Preferably, the combined cell is defined in that at least two TRXPs transmit identical SSBs at a same time and frequency so that a UE perceives it to represent a same SSB.

In a preferred embodiment, the selection of a cell is performed dependent on needs and capabilities of the UE.

The first cell is preferably selected if the UE requires Mobile Broadband communication. The first cell is preferably selected if the UE requires communication of non-real-time video or image data.

The second cell is preferably selected if communication with the UE is reliability sensitive. The second cell is preferably selected if the UE requires voice communication, real-time video communication, interactive gaming communication or communication of latency-sensitive control communication.

With the multi TRXP SSB deployment it is thus possible to configure the connections individually per UE, adapted to respective needs and capabilities, in the same area. A UE can be configured to the single SSB per TRXP where a handover between TRXP's then are performed. A UE can be configured to the combined cell type of SSB where multiple TRXPs are a single cell. Thereby the robust and RRC signalling free and seamless handover between TRXPs can be achieved for this UE, at the expense of capacity i.e. as in legacy SFN Combined Cell.

Figure 2:
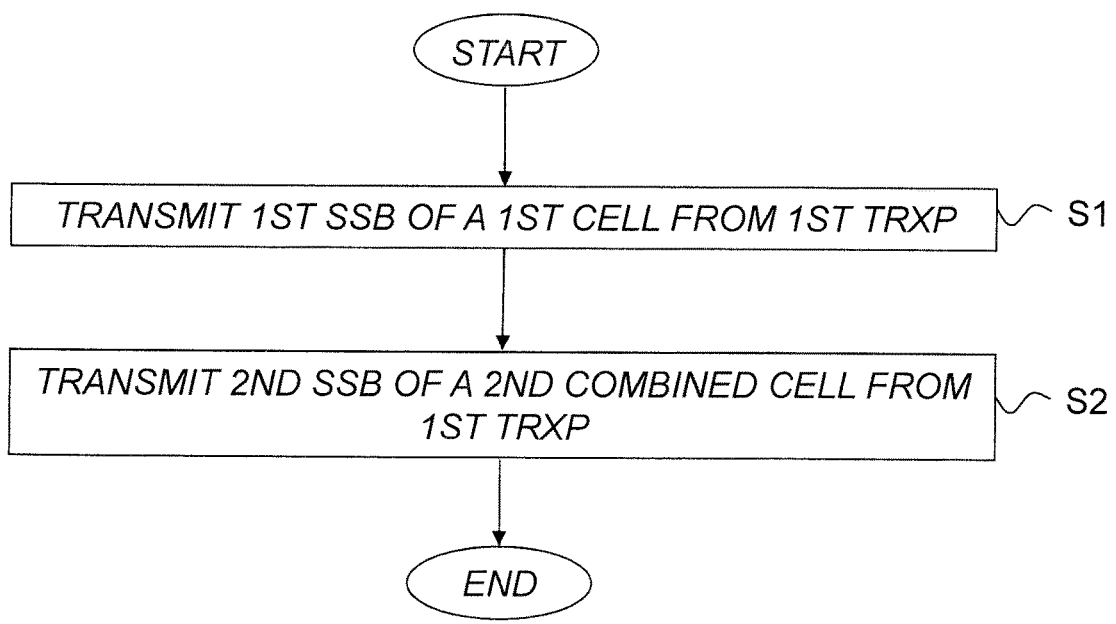
FIG. 2 is a schematic flow diagram illustrating steps of an embodiment of a method for arranging transmission of SSBs.

These possibilities are thus based on the provision of more than one SSB from a single TRXP. FIG. 2 is a schematic flow diagram illustrating steps of an embodiment of a method for arranging transmission of SSBs. In step S1, first SSBs are transmitted at a carrier. The transmission is performed from a first TRXP of a cellular telecommunication system. The first SSBs define a first cell. This cell is unique for the first TRXP. In step S2, second SSBs are transmitted at the carrier. The transmission is performed from the same first TRXP. The second SSBs define a second cell. The second cell is a combined cell of the first TRXP and at least one neighbouring, second TRXP.

Preferably, the combined cell is defined in that at least two TRXPs transmit identical SSBs at a same time and frequency so that a UE perceives it to represent a same SSB.

As mentioned briefly above, the SSB can preferably comprise, and thereby be identified by, a PCI. In other words, the first SSBs comprise a PCI of the first cell and the second SSBs comprise a PCI of the second cell. SSBs defining the second cell transmitted from different TRXPs comprises thereby preferably the same PCI of the second cell.

In a preferred embodiment, the PCI comprises a PSS and an SSS. The solution thus allows a UE to support the TRXP selection by blind detection and measurements of many unique SSBs. For NR, 1008 SSBs are available.

In one embodiment, first SSBs and second SSBs are provided concurrently and/or interleaved in time.

In a case, where two different SSBs are to be transmitted from a TRXP, there are four main alternatives of arrangements. The different types of SSB transmission from multiple TRXP's are to allow one transmission to be perceived as e.g. SFN combined and the other to be perceived as unique per TRXP.

Figure 3A:
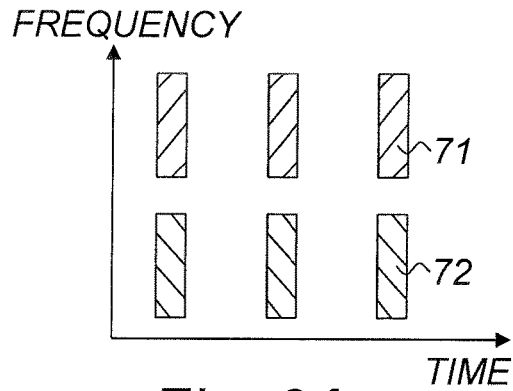
FIGS. 3A-D are examples of distribution of SSBs in a frequency/time space.

FIG. 3A illustrates schematically an embodiment where the SSB transmissions are separated in frequency. A first SSB 71 is transmitted in one subcarrier and a second SSB 72 is transmitted in another non-overlapping sub carrier. The two types of SSB transmissions are in this embodiment transmitted at the same time. A UE will thus perceive this situation as Inter frequency cells.

In other words, in one embodiment, first SSBs are provided at a different frequency compared to second SSBs.

Figure 3B:
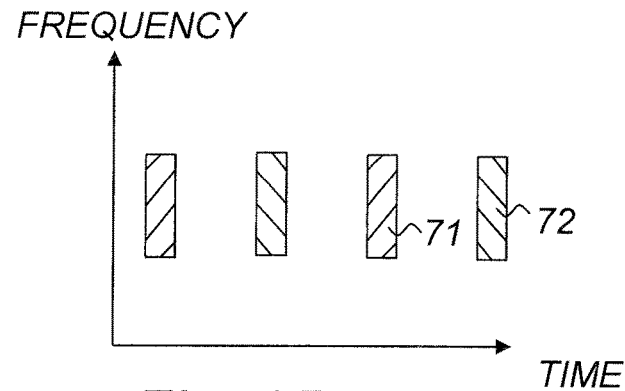

FIG. 3B illustrates schematically another embodiment, where the SSB transmissions are separated in time. The first SSB 71 and the second SSB 72 use overlapping sub carriers but transmit the two types of SSB transmissions at different non-overlapping times. A UE will perceive this as Intra frequency non time aligned cells.

In other words, in one embodiment, first SSBs are provided at a different time slot compared to second SSBs.

Figure 3C:
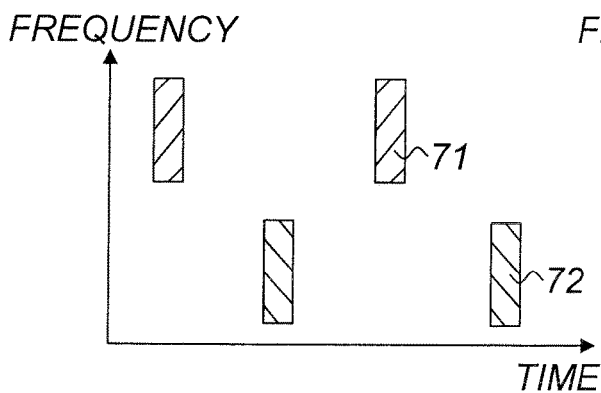

FIG. 3C illustrates schematically yet another embodiment, where the SSB transmissions are separated in both time and frequency. The first SSB 71 and the second SSB 72 use non-overlapping sub carriers for the transmission and transmit the two types of SSB transmissions at different non-overlapping times. A UE will perceive this as Inter frequency non time aligned cells.

In other words, in one embodiment, first SSBs are provided at a different time slot as well as a different frequency compared to second SSBs.

Figure 3D:
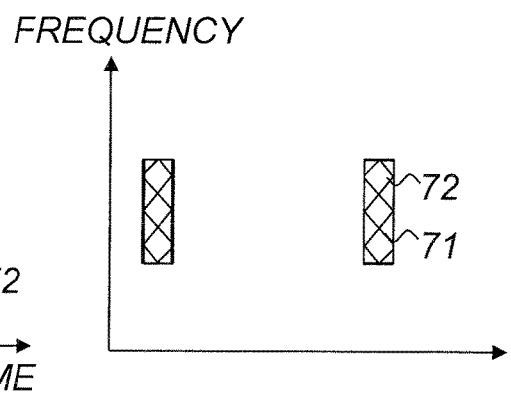

FIG. 3D illustrates schematically yet another embodiment, where both SSB transmissions 71, 72 from one TRXP are superimposed on top of each other. The first SSB 71 and the second SSB 72 thus use exactly the same resource elements (RE). Preferably, if PSS/SSS is used for identification, the same RE is used for the PSS/SSS transmission comprising a same PSS signal but with differing SSS signals. A UE will perceive this as Intra frequency Cells. In this case the SSB transmission may need to be boosted 3 dB to allow SSB power levels to be on par with other transmission from the TRXP.

In other words, in one embodiment, at least one of the first SSBs and at least one of the second SSBs are superimposed on top of each other, using a same resource element.

Besides the above described main alternatives, the periodicity of the SSB transmissions may also be altered.

In one embodiment, a time between two consecutive first SSBs is the same a time between two consecutive second SSBs.

Figure 4A:
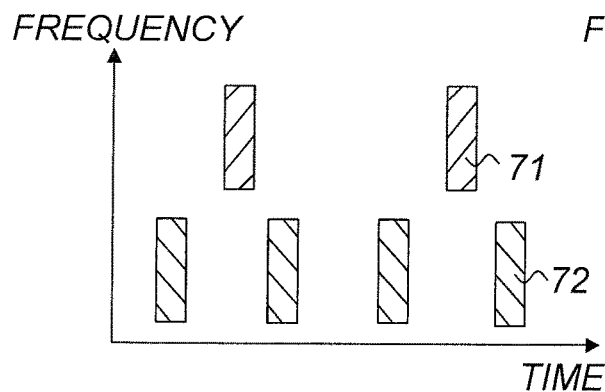
FIGS. 4A-B are examples of distribution of SSBs with differing periodicity.
Figure 4B:
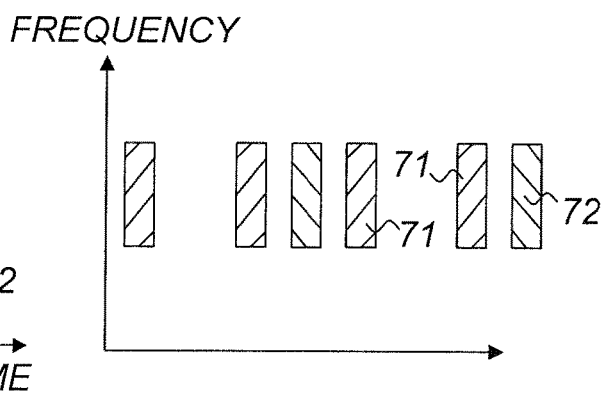

However, in alternative embodiments, the periodicity for the two types of SSB transmissions may differ. FIG. 4A illustrates schematically an embodiment, where the SSBs 71 and 72 use different sub carriers and furthermore present different periodicity. FIG. 4B illustrates schematically an embodiment, where the SSBs 71 and 72 use the same sub carrier but use different periodicity. From these examples, a person skilled in the art realizes that there are further possible variations. The periodicity difference may also be much larger than illustrated. For instance, one SSB may be transmitted with a 5 ms periodicity and the other with a 160 ms periodicity, as currently allowed by NR standard.

In other words, in one embodiment, a time between two consecutive first SSBs is different from a time between two consecutive second SSBs.

Figure 5:
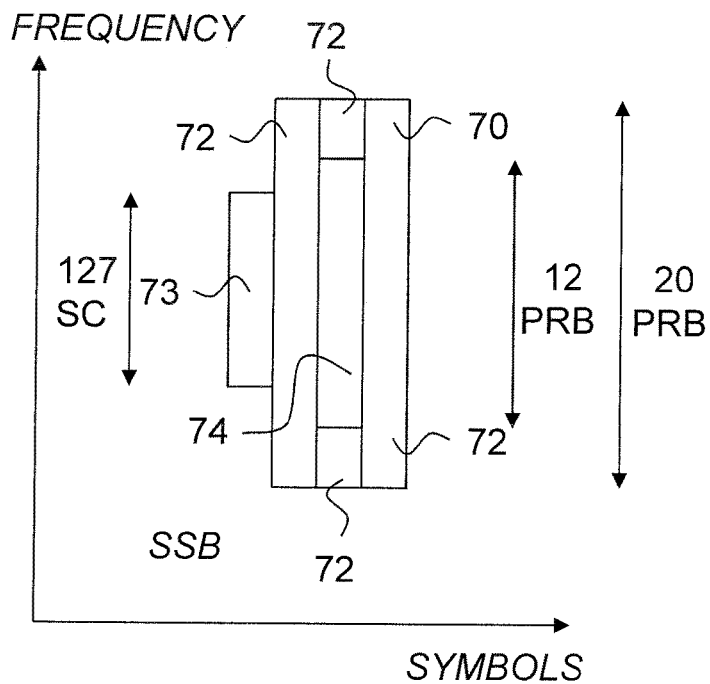
FIG. 5 is a schematic illustration of an embodiment of an SSB.

FIG. 5 illustrates one example of how an SSB 70 can be constituted. A PSS 73 and an SSS 74 are interleaved with Physical Broadcast Channel (PBCH) signalling 72. The PSS/SSS 73, 74 provides possibility for the UE to easily search and blank detect the CELL, and the PBCH provide the UE with information required to use the CELL e.g. perform initial access. The PSS 73 here corresponds to 127 Sector Carriers and the SSS 74 occupies 12 Physical Resource Blocks (PRB), while the entire SSB 70 utilizes 20 PRB.

A UE may perform a matched filtering to find PSS 73. In long-term evolution (LTE), there are 3 different PSS available. The UE may then detect the SSS in frequency domain. In LTE, there are 336 different PSS available. PSS and SSS together indicate the physical cell ID. The UE decodes Master Information Block (MIB) contained in PBCH, e.g. slot timing and CORESET for ReMaining System Information (RMSI) scheduling. After the UE has read RMSI, it can perform random access.

Figure 6:
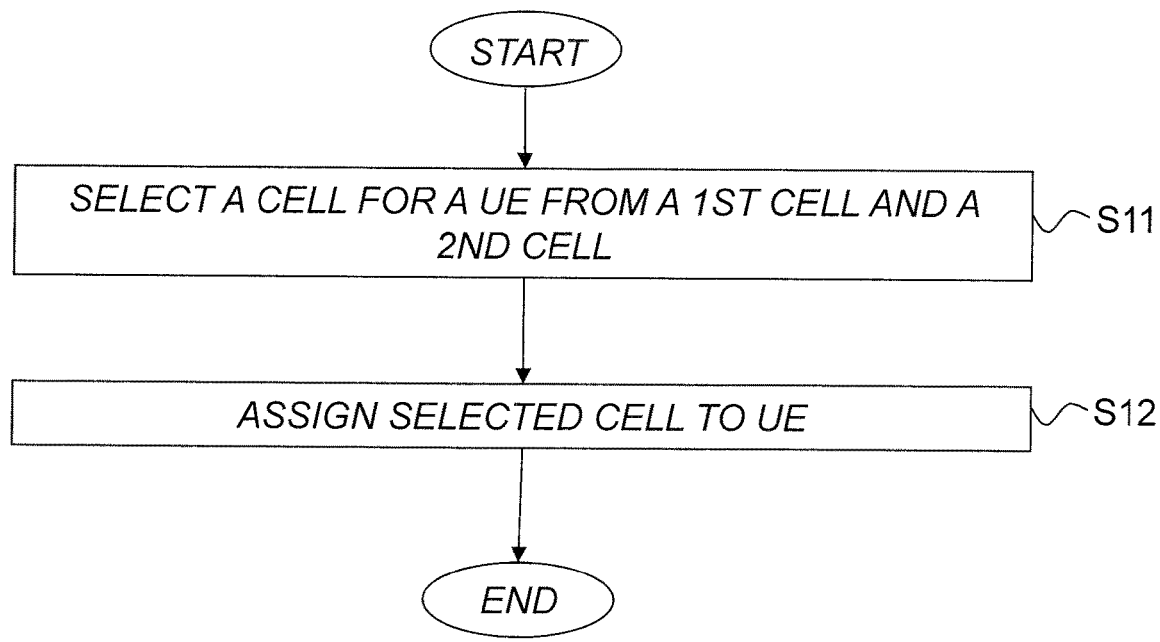
FIG. 6 is a schematic flow diagram illustrating steps of an embodiment of a method for cell assignment.

As described above, the SSBs can be used for assignment of cells. FIG. 6 is a schematic flow diagram illustrating steps of an embodiment of a method for cell assignment. In step S11, a cell is selected which is intended for a UE. The cell is selected out of at least a first cell and a second cell. The first cell is unique for a first TRXP. The second cell is a combined cell of the first TRXP and at least one neighbouring, second TRXP. In step S12, the selected cell is assigned to the UE.

Figure 7:
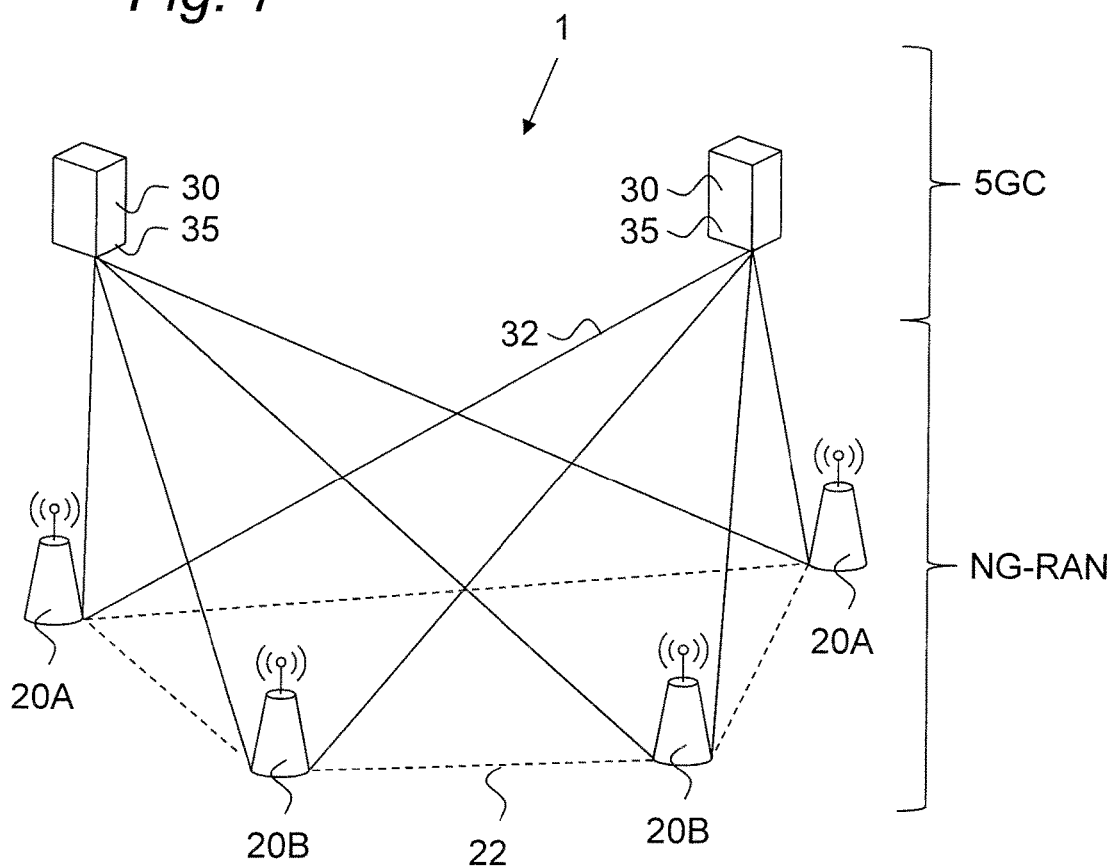
FIG. 7 is a schematic illustration of nodes and interfaces in an embodiment of a cellular communication system.

FIG. 7 is a schematic illustration of one embodiment of a top-level overview of Nodes and Interfaces in a new generation cellular communication system 1. The new generation radio access network (NG-RAN) comprises a number of nodes, in this embodiment gNB 20A and ng-eNB 20B. Each NG-RAN node 20A, 20B is associated with at least one TRXP. Each NG-RAN node can support one or several cells where each cell can use one or several TRXP's for transmission and reception. The Access Management Function/User Plane Function (AMF/UPF) 35 are provided in network nodes 30 of the core of the $5^{th}$ generation (5GC). The AMF/UPF 35 communicates with the gNB 20A and ng-eNB 20B via an NG interface 32. The gNB 20A and ng-eNB 20B may communicate internally in the NG-RAN by the Xn interface 22.

The multi TRXP SSB deployment opens also up for other implementations as well. A UE can support multiple-TRXP communication, see e.g. 3GPP Release 16. The UE is then connected to one TRXP, as a PCell. At the same time, radio resources of another cell can be utilized, i.e. a signalling path to another TRXP can be established. Thereby, the UE and the system simultaneously have two separate path alternatives for communication, where it can transmit information. This can provide a higher reliability since the connection is not dependent on only one path i.e. if one path has radio fading the connection might remain via the other path, where information can be sent. Secondly it is possible to increase the rate since an aggregation of the rate from the two paths is possible.

From the configuration above, it can be understood that the information of how and when SSBs are to be transmitted from a TRXP may be provided from elsewhere, e.g. by or via an NG-RAN node 20A, 20B. Configuring the SSB for a TRXP is typically provided via and O&M interface, e.g. by hand of the operator or via some automation algorithm outside NG-RAN or algorithms within NG-RAN nodes. In other words, in one embodiment, the method for arranging transmission of synchronization signal blocks further comprises receiving of SSB configuration data from a NG-RAN node defining the first and second SSBs. The transmitting of the first SSBs and the transmitting of the second SSBs are performed according to the received SSB configuration data.

The multiple-TRXP approach operates very well with the here presented techniques. For a UE that can support multiple-TRXP, it is possible to configure the UE with one connection to a multi-TRXP SSB (SSB0) and another connection towards a single TRXP SSB. Preferably, the PCell is configured to the multi-TRXP SSB cell. This cell may also be used for some high reliable services, e.g. Voice. At the same time, any high capacity data service can be directed to use radio resources of the single-TRXP cell, as a multiple-TRXP communication. In this way it becomes possible to combine both high reliable performance and high capacity. No handover is required for the PCell when changing the used single-TRXP within the multi-TRXP SSB Cell. For the secondary leg it is possible to also avoid RRC signalling, when changing TRXP. The connection can remain the same, i.e. UE specific, while a Layer 2 dynamic point switch is required to change from which TRXP it is connected to.

Figure 8:
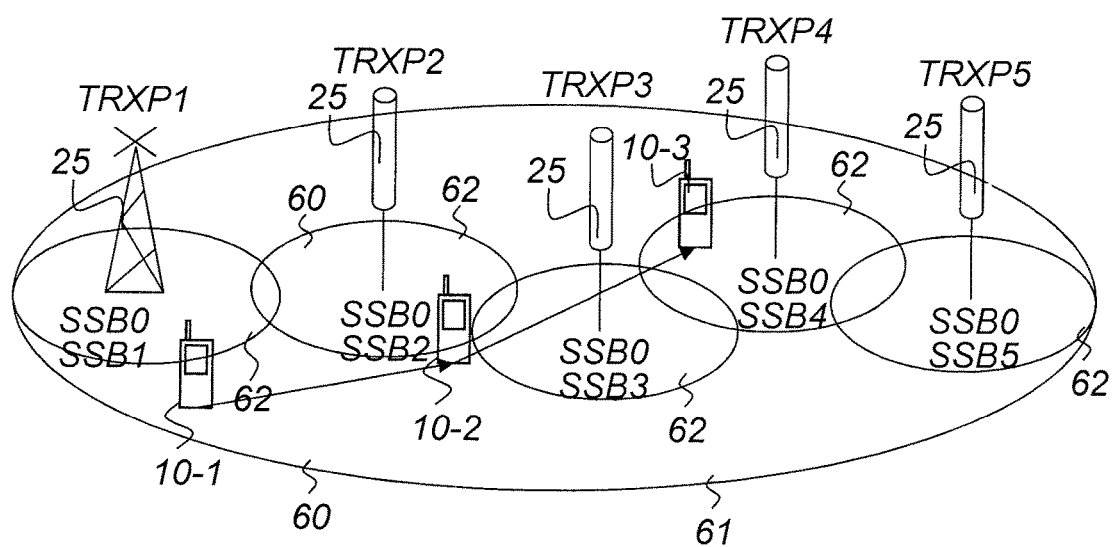
FIG. 8 is a schematic illustration of a moving UE in an embodiment of co-existing single-TRXP cells and multi-TRPX cells.

FIG. 8 illustrates schematically some of these aspects. A UE 10 is present at a first time instant at the position indicated by 10-1. When connecting to the network, the UE connects the single-TRXP cell 62 associated with the SSB1. However, when the connection is established, and the UE requests both high reliability as well as high capacity, the UE is handed over to the multi-TRXP cell 61 associated with SSB0. The UE is thereby free to move within the entire cell 61 without needing any handover.

The UE supports multiple-TRXP and the multi-TRXP cell 61 associated with SSB0 is used as PCell. A second signalling path is, however, established utilizing radio resources of the cell single-TRXP cell 62 associated with the SSB1. This path is preferably used for signalling requiring high capacity.

When the UE moves to the position illustrated by 10-2, the UE is still present within the PCell, i.e. within the multi-TRXP cell 61 associated with SSB0. No handover has been made. However, at the new position of the UE, the radio conditions to the single-TRXP cell 62 associated with the SSB2 are better than the radio conditions to the single-TRXP cell 62 associated with the SSB1. Accordingly, the second signalling path is changed to make use of radio resources of the cell single-TRXP cell 62 associated with the SSB2.

At a further later occasion, the UE is present at the site indicated by 10-3. In a similar fashion, the PCell is unaltered, while the high capacity requiring signalling is performed using radio resources of the cell single-TRXP cell 62 associated with the SSB4.

In other words, in one embodiment, the second cell is selected and assigned to a UE. The UE is a UE having capabilities of multi-TRXP. The signalling to the UE that is reliability sensitive is preferably scheduled to use the second cell. A signalling path is established to the TRXP that is associated with the first cell. The signalling path is used for parts of the communication with the UE while the UE still is connected to the second cell.

Preferably, the signalling path is used for parts of the communication with the UE requiring Mobile Broadband communication.

As mentioned in the background, within a multi-TRXP cell, a number of TRXPs will transmit essentially the same information. This occupies radio resources that otherwise could have been used for other communication. Furthermore, the transmission all-over the multi-TRXP cell will also cause an increased interference with other signalling. These are disadvantages that have to be weighted against the benefits of not having to perform handovers etc.

The present configuration with TRXPs signalling more than one SSB may, however, allow for measures to reduce these negative features of a combined cell. A UE that is present in the area of TRXPs signalling more than one SSB each, will interpret each SSB as a separate cell. Again, it is illustrative to consult FIG. 8. The UE will continuously detect signals associated with the SSB0, SSB1, . . . , SSB5, with signal strengths depending on the position of the UE. In the position indicated by 10-1, the SSB0 and SSB1 signals are typically the most prominent ones. Even if the UE is connected to the combined cell SSB0, the NW has information of that the UE is situated in the vicinity of the TRXP transmitting the SSB1 signal. The NW is then aware of that the transmissions for the cell of SSB0 made by the TRXP also associated with the SSB5 probably does not contribute very much to the final radio signal as detected by the UE. Such transmissions within the cell SSB0 are thus only waisted and do only contribute to an increased interference level.

By having knowledge about the position of the UE, the NW can thereby modify the configuration of the combined cell. For instance, if the signal strength from a certain TRXP is below a predetermined threshold, the NW may e.g. reduce resource usage for the user data to the UE from that TRXP in the combined cell. Signalling of user data within the combined cell based on SSB0 to the UE situated at the position 10-1 from the TRXP5 and the TRXP4 can probably be reduced without affecting the detectable signal for the UE.

When the UE moves to the position 10-2, the contribution from TRXP4 may possibly be of benefit and the reduction may be revoked. When the UE is situated in the position 10-3, the signalling from TRXP4 is probably the most important, and signalling from TRXP3 and TRXP5 may also contribute. However, at that position, it is instead possible to reduce the resource usage of TRXP1 for the combined cell signalling.

In other words, an embodiment of a method for resource control in a cellular communication system comprises obtaining of signal strength measurements from a UE. The signal strength measurements comprise signals of first SSBs and second SSBs. The first SSBs define a first cell. The first cell is unique for a first TRXP. The second SSBs define a second cell. The second cell is a combined cell of the first TRXP and at least one neighbouring, second TRXP. A distribution of transmission and reception resources for user data to the UE in the second cell between TRXPs participating in the second cell is controlled depending at least on the obtained signal strength measurements for the first synchronization blocks.

Preferably, the signal strength measurements further comprise signals of SSBs of unique cells of TRXPs participating in the second cell. Thereby, the controlling is further based on the SSBs of unique cells of TRXPs participating in the second cell.

Preferably, the controlling comprises reducing of resource usage for the user data to the UE from TRXPs participating in the second cell and providing signals of SSBs of unique cells giving signal strengths in the UE below a threshold value.

So far, the description above has been based on the transmission of two sets of SSBs from a single TRXP. However, this concept can of course be expanded to more than two sets of SSBs from a single TRXP. The additional SSBs can then be utilized to define combined cells spanned by different sets of TRXPs. This allows e.g. for adapting an area over which handover is unnecessary to the needs of a particular UE. Such adapting may therefore allow a more efficient utilization of radio resources. For instance, if a UE is assumed to stay within a limited area, a combined cell covering a much larger area will lead to an inefficient utilization of the radio resources.

In other words, in one embodiment, the method for arranging transmission of synchronization signal blocks further comprises transmitting, from the first TRXP, additional SSBs at the carrier. These additional SSBs define at least one additional cell. The at least one additional cell is a combined cell of the first TRXP and at least one neighbouring, additional TRXP, where the additional TRXP is different from the second TRXP.

As used herein, the non-limiting terms "User Equipment (UE)", "station (STA)" and "wireless communication device" or "wireless device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station", the term "wireless device" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs (NB), evolved Node Bs (eNB) or new radio Node Bs (gNB) or en-gNB and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a TRXP configured to arrange transmission of SSBs. The TRXP is configured to transmit first SSBs at a carrier. The first SSBs define a first cell. The first cell is unique for the TRXP. The TRXP is configured to transmit second SSBs at the carrier. The second SSBs define a second cell. The second cell is a combined cell of the TRXP and at least one neighbouring, second TRXP.

Figure 9:
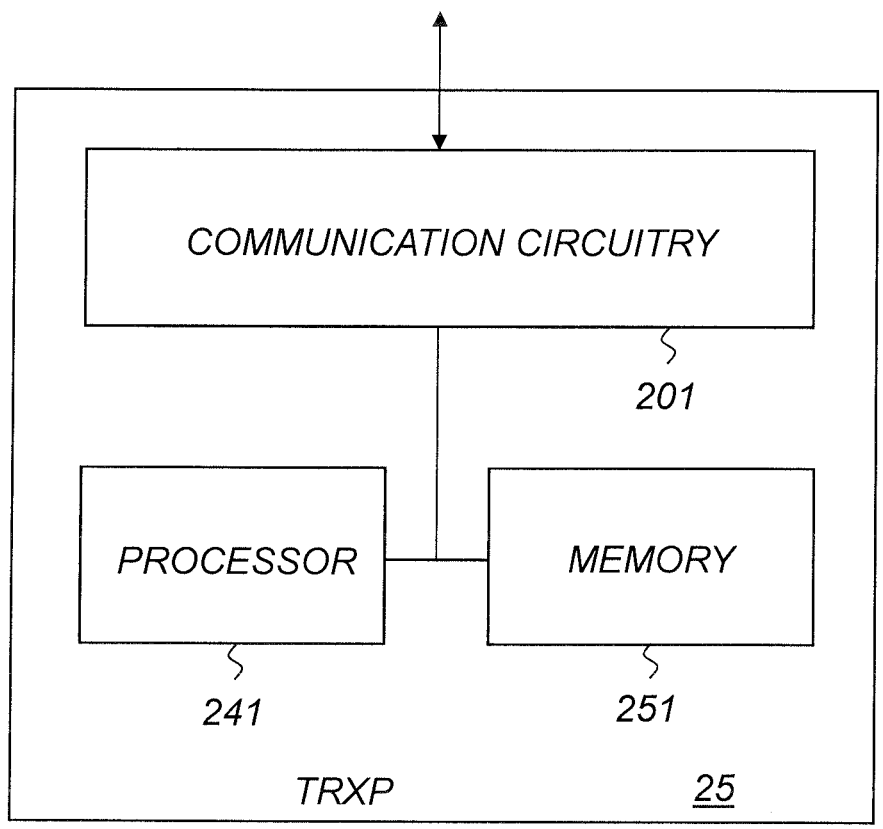
FIG. 9 is a schematic block diagram illustrating an embodiment of a TRXP.

FIG. 9 is a schematic block diagram illustrating an example of a TRXP 25, based on a processor-memory implementation according to an embodiment. In this particular example, the TRXP 25 comprises a processor 241 and a memory 251, the memory 251 comprising instructions executable by the processor 241.

The TRXP 25 also include a communication circuitry 201. The communication circuitry 201 may include functions for wired and/or wireless communication with other devices and/or network nodes in the network. In a particular example, the communication circuitry 201 may be based on radio circuitry for communication with one or more other nodes, including transmitting and/or receiving information. The communication circuit 201 is interconnected to the processor 241 and/or memory 251. By way of example, the communication circuit 201 may include any of the following: a receiver, a transmitter, a transceiver, input/output (I/O) circuitry, input port(s) and/or output port(s). The communication circuit 201 is operative to transmit the first SSBs at the carrier and to transmit the second SSBs at the carrier.

In one embodiment, the combined cell is defined in that at least two TRXPs transmit identical SSBs at a same time and frequency so that a UE perceives it to represent a same SSB.

In one embodiment, the first SSBs comprise a physical cell identity of the first cell and the second SSBs comprise a physical cell identity of the second cell. In further embodiment, the SSBs defining the second cell transmitted from different TRXPs comprises the same physical cell identity of the second cell. Preferably, the physical cell identity comprises a primary synchronization signal and a secondary synchronization signal.

In one embodiment, the first SSBs and the second SSBs are provided concurrently and/or interleaved in time.

In one embodiment, at least one of the first SSBs and at least one of the second SSBs are superimposed on top of each other, using a same resource element.

In one embodiment, the first SSBs are provided at a different frequency compared to the second SSBs.

In one embodiment, the first SSBs are provided at a different time slot compared to the second SSBs.

In one embodiment, the first SSBs are provided at a different time slot as well as a different frequency compared to the second SSBs.

In one embodiment, a time between two consecutive first SSBs is different from a time between two consecutive second SSBs.

In one embodiment, a time between two consecutive first SSBs is the same a time between two consecutive second SSBs.

In one embodiment, the TRXP is further configured to receive SSB configuration data from a NG-RAN node defining the first and second SSBs. The TRXP is further configured to perform the transmitting of the first SSBs and the transmitting of the second SSBs according to the received SSB configuration data.

In one embodiment, the TRXP is further configured to transmit additional SSBs at the carrier. The additional SSBs define at least one additional cell. The at least one additional cell is a combined cell of the first TRXP and at least one neighbouring, additional TRXP, where the additional TRXP is different from the second TRXP.

According to another aspect of the proposed technology there is provided a network node configured for cell assignment. The network node is configured to select a cell intended for a UE out of at least a first cell and a second cell. The first cell is unique for a first TRXP. The second cell is a combined cell of the first TRXP and at least one neighbouring, second TRXP. The network node is further configured to assign the selected cell to the UE.

Figure 10:
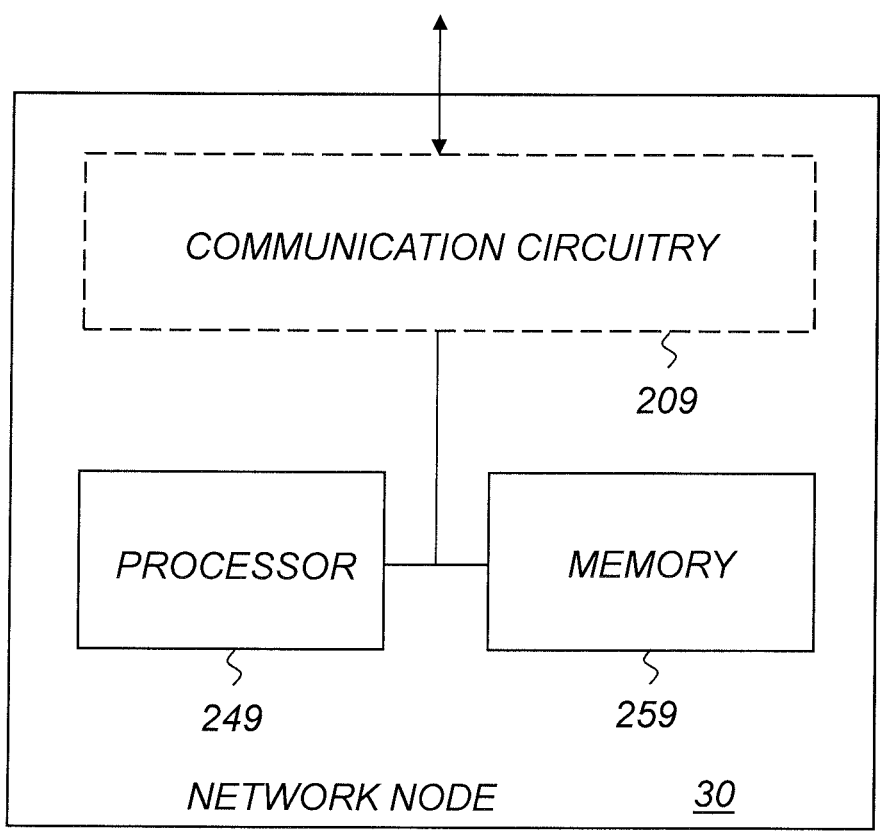
FIG. 10 is a schematic block diagram illustrating an embodiment of a network node.

FIG. 10 is a schematic block diagram illustrating an example of a network node 30, based on a processor-memory implementation according to an embodiment. In this particular example, network node 30 comprises a processor 249 and a memory 259, the memory 259 comprising instructions executable by the processor 249, whereby the processor 249 is operative to assign the selected cell to the UE.

The network node 30 may also include a communication circuitry 209. The communication circuitry 209 may include functions for wired and/or wireless communication with other devices and/or network nodes in the network. In a particular example, the communication circuitry 209 may be based on radio circuitry for communication with one or more other nodes, including transmitting and/or receiving information. The communication circuit 209 may be interconnected to the processor 249 and/or memory 259. By way of example, the communication circuit 209 may include any of the following: a receiver, a transmitter, a transceiver, input/output (I/O) circuitry, input port(s) and/or output port(s).

In one embodiment, the combined cell is defined in that at least two TRXPs transmit identical SSBs at a same time and frequency so that a UE perceives it to represent a same SSB.

In one embodiment, the network node is further configured to perform selection of a cell dependent on needs and capabilities of the UE.

In one embodiment, the network node is further configured to select the first cell if the UE requires Mobile Broadband communication. In a further embodiment, the network node is further configured to select the first cell if the UE requires communication of non-real-time video or image data.

In one embodiment, the network node is further configured to select the second cell if communication with the UE is reliability sensitive. In a further embodiment, the network node is further configured to select the second cell if the UE requires voice communication, real-time video communication, interactive gaming communication or communication of latency-sensitive control communication.

In one embodiment, the network node is configured to select the second cell and to assign the second cell to the UE. The UE is a UE having capabilities of multi-TRXP. Thereby, the network node is configured to preferably schedule signalling to the UE requiring Guaranteed Bit Rate to use the second cell. The network node is further configured to establish a signalling path to the TRXP that is associated with the first cell. Thereby, the network node is further configured to use the signalling path for parts of the communication with the UE while the UE still is connected to the second cell.

Preferably, the network node is configured to use the second cell for parts of the communication with said UE being reliability sensitive.

Preferably, the network node is configured to use the signalling path of the first cell for parts of the communication with the UE requiring Mobile Broadband communication.

According to another aspect of the proposed technology there is provided a network node configured for resource control in a cellular communication system. The network node is configured to obtain signal strength measurements from a UE. The signal strength measurements comprise signals of first SSBs and second SSBs. The first SSBs define a first cell. The first cell is unique for a first TRXP. The second SSBs defining a second cell. The second cell is a combined cell of the first TRXP and at least one neighbouring, second TRXP. The network node is further configured to control a distribution of transmission and reception resources for user data to the UE in the second cell between TRXPs participating in the second cell dependent at least on the obtained signal strength measurements for the first synchronization blocks.

An implementation of such a network node can also be illustrated by FIG. 10.

Preferably, the signal strength measurements further comprise signals of SSBs of unique cells of TRXPs participating in the second cell. The network node is configured to base the controlling of the distribution of transmission and reception resources for user data to the UE in the second cell on the SSBs of unique cells of TRXPs participating in the second cell.

Preferably, the network node is configured to reduce resource usage for the user data to the UE from TRXPs participating in the second cell and providing signals of SSBs of unique cells giving signal strengths in the UE below a threshold value.

Figure 11:
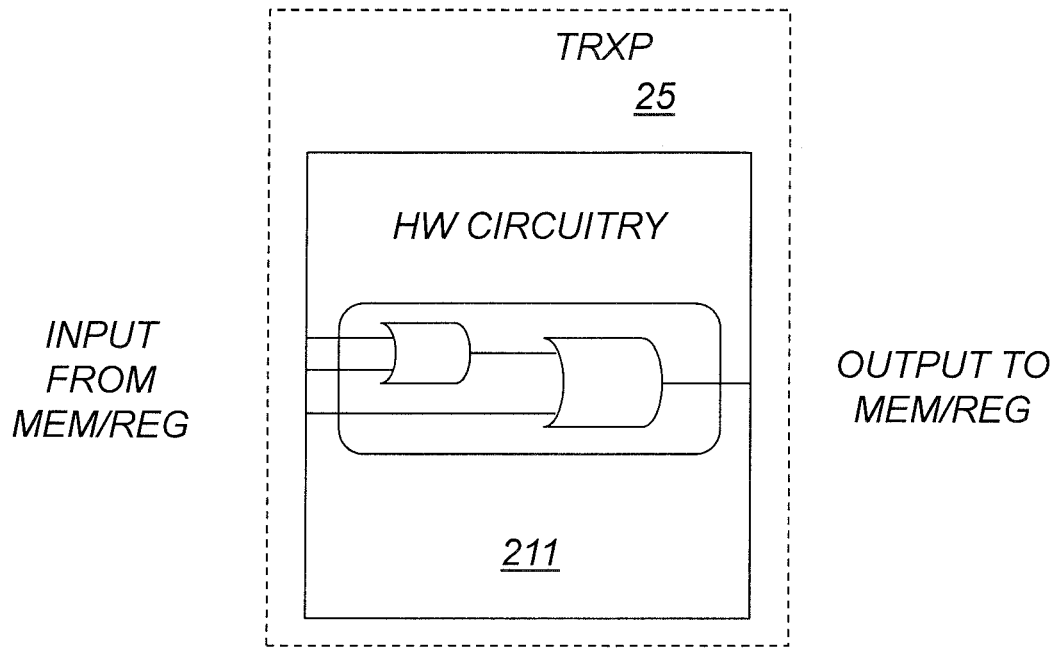
FIG. 11 is a schematic block diagram illustrating an embodiment of a TRXP based on a hardware circuitry implementation.

FIG. 11 is a schematic block diagram illustrating another example of a TRXP 25, based on a hardware circuitry implementation according to an embodiment. Particular examples of suitable hardware (HW) circuitry 211 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 12:
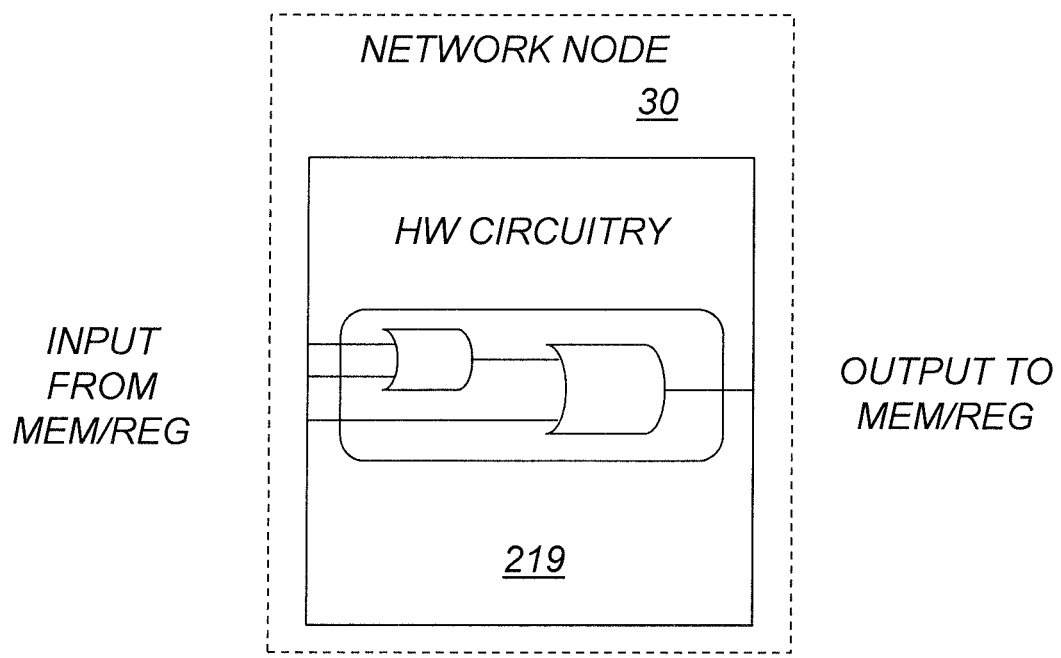
FIG. 12 is a schematic block diagram illustrating an embodiment of a network node based on a hardware circuitry implementation.

FIG. 12 is a schematic block diagram illustrating another example of a network node 30, based on a hardware circuitry implementation according to an embodiment. Particular examples of suitable hardware (HW) circuitry 219 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 13:
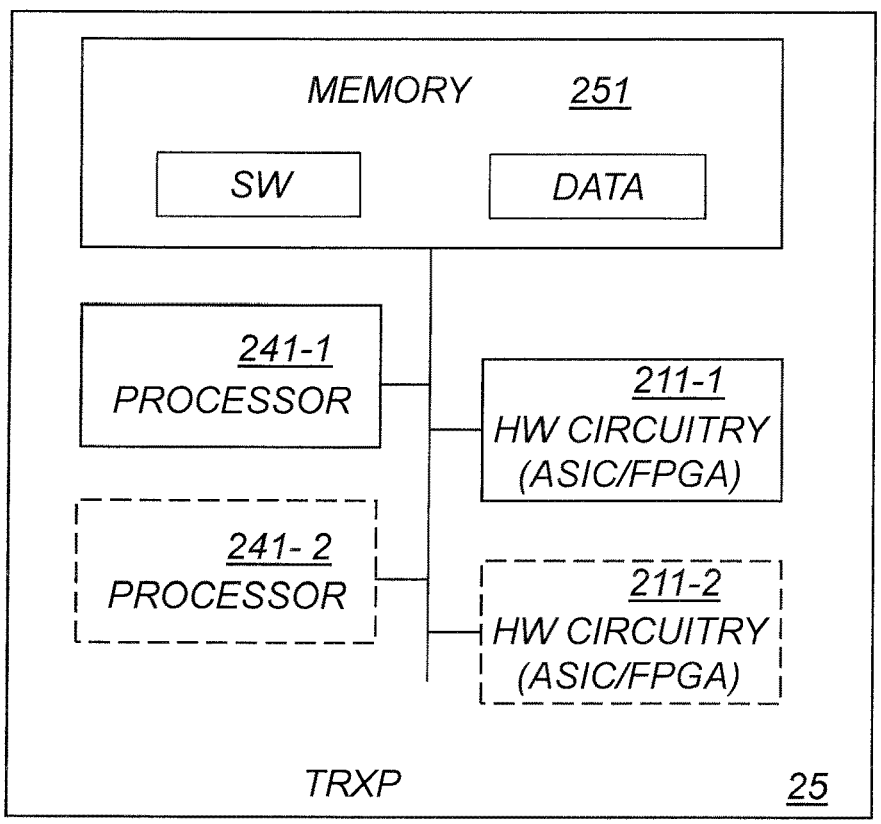
FIG. 13 is a schematic block diagram illustrating another embodiment of a TRXP based on combination of both processor and hardware circuitry.

FIG. 13 is a schematic block diagram illustrating yet another example of a TRXP 25, based on combination of both processor(s) 241-1, 241-2 and hardware circuitry 211-1, 211-2 in connection with suitable memory unit(s) 251. The TRXP 25 comprises one or more processors 241-1, 241-2, memory 251 including storage for software and data, and one or more units of hardware circuitry 211-1, 211-2 such as ASICs and/or FPGAs. The overall functionality is thus partitioned between programmed software (SW) for execution on one or more processors 241-1, 241-2, and one or more pre-configured or possibly reconfigurable hardware circuits 211-1, 211-2 such as ASICs and/or FPGAs. The actual hardware-software partitioning can be decided by a system designer based on a number of factors including processing speed, cost of implementation and other requirements.

Figure 14:
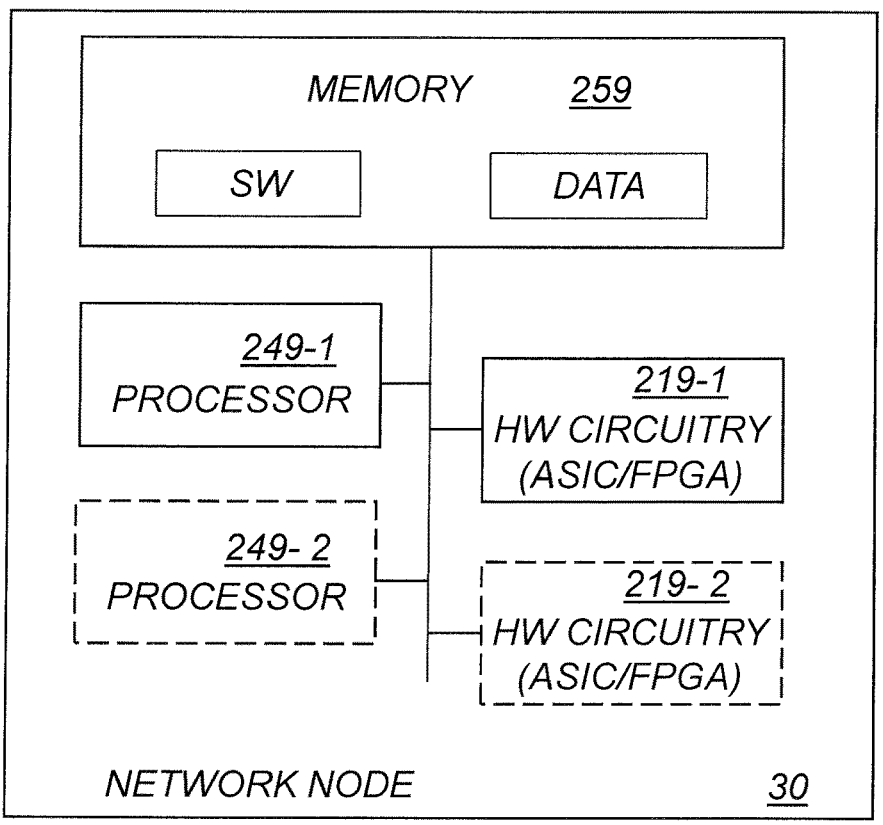
FIG. 14 is a schematic block diagram illustrating another embodiment of a network node based on combination of both processor and hardware circuitry.

FIG. 14 is a schematic block diagram illustrating yet another example of a network node 30, based on combination of both processor(s) 249-1, 249-2 and hardware circuitry 211-9, 219-2 in connection with suitable memory unit(s) 259. The network node 30 comprises one or more processors 249-1, 249-2, memory 259 including storage for software and data, and one or more units of hardware circuitry 219-1, 219-2 such as ASICs and/or FPGAs. The overall functionality is thus partitioned between programmed software (SW) for execution on one or more processors 249-1, 249-2, and one or more pre-configured or possibly reconfigurable hardware circuits 219-1, 219-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 15:
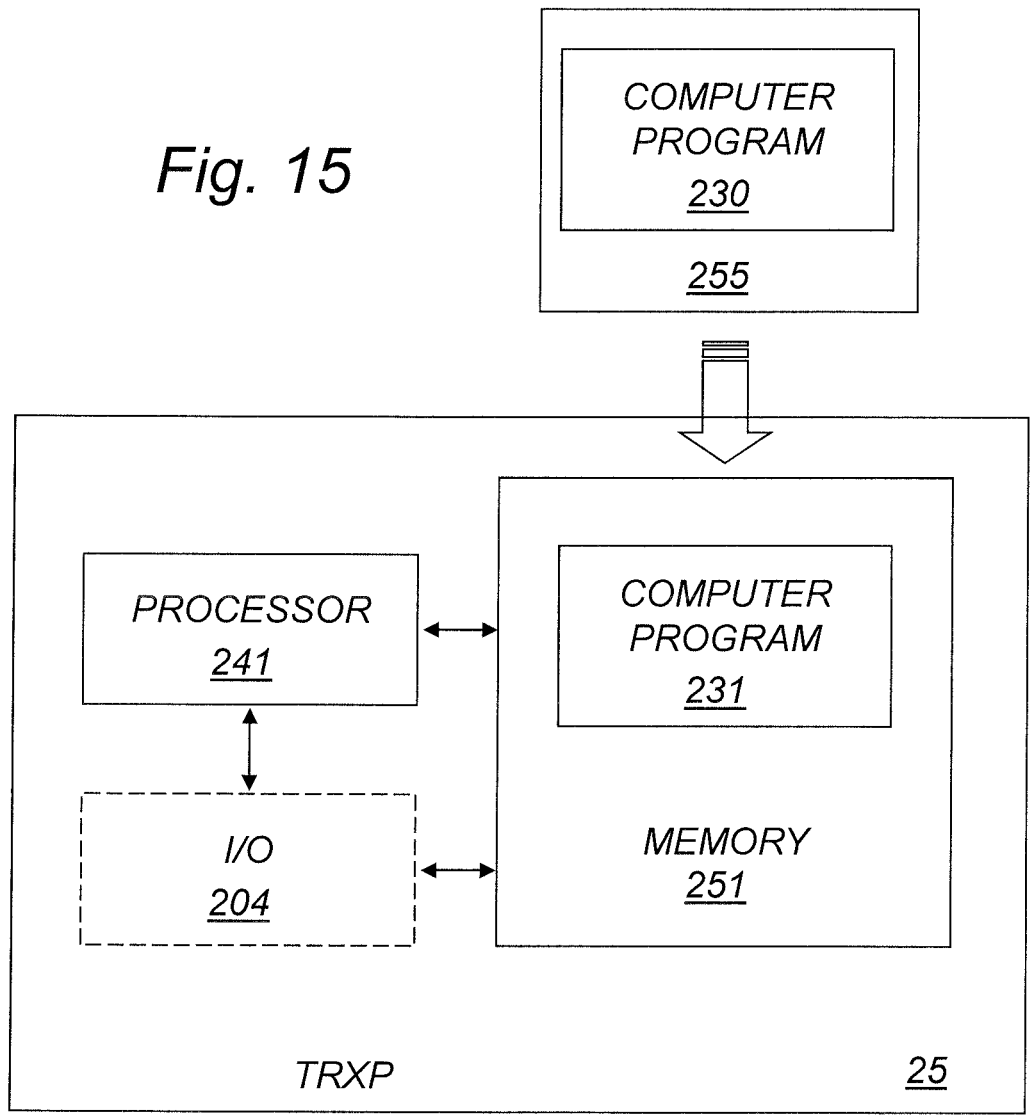
FIG. 15 is a schematic diagram illustrating an embodiment of a computer-implementation of a TRXP.
Figure 16:
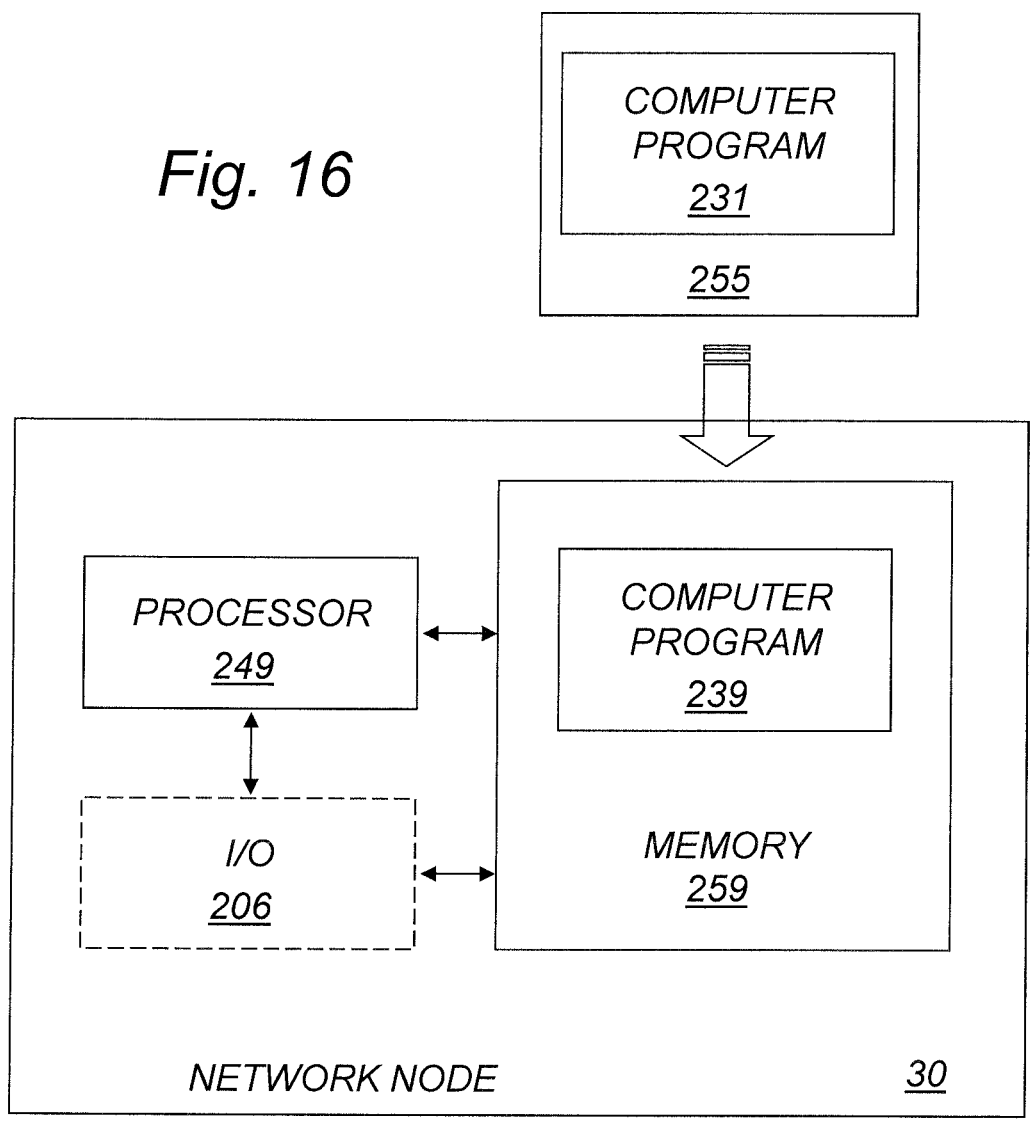
FIG. 16 is a schematic diagram illustrating an embodiment of a computer-implementation of a network node.

FIG. 15 is a schematic diagram illustrating an embodiment of a computer-implementation of a TRXP 25. In this particular embodiment, at least some of the steps, functions, procedures, modules and/or blocks described herein are implemented in a computer program 231, which is loaded into the memory 251 for execution by processing circuitry including one or more processors 241. The processor(s) 241 and memory 251 are interconnected to each other to enable normal software execution. An optional input/output device 204 may also be interconnected to the processor(s) 241 and/or the memory 251 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 241 is thus configured to perform, when executing the computer program 231, well-defined processing tasks such as those described herein. The terms "processing circuitry" and "processor" will in the present disclosure be used as synonymous expressions.

The processing circuitry does not have to be dedicated to only execute the above-described steps, functions, procedure and/or blocks, but may also execute other tasks.

In a particular embodiment, the computer program 231 comprises instructions, which when executed by at least one processor 241, cause the processor(s) 241 to cause transmission of first SSBs at a carrier. The first SSBs define a first cell. The first cell is unique for the TRXP. The instructions, when executed by the processor(s) 241, further cause the processor(s) 241 to cause transmission of second SSBs at the carrier. The second SSBs define a second cell. The second cell is a combined cell of the TRXP and at least one neighbouring, second TRXP.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 230; 231 may be realized as a computer program product, which is normally carried or stored on a computer-readable medium 255; 251, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

FIG. 15 is a schematic diagram illustrating an embodiment of a computer-implementation of a network node 30. In this particular embodiment, at least some of the steps, functions, procedures, modules and/or blocks described herein are implemented in a computer program 239, which is loaded into the memory 259 for execution by processing circuitry including one or more processors 249. The processor(s) 249 and memory 259 are interconnected to each other to enable normal software execution. An optional input/output device 206 may also be interconnected to the processor(s) 249 and/or the memory 259 to enable input and/or output of relevant data such as input parameter(s) and/or resulting output parameter(s).

In a particular embodiment, the computer program 239 comprises instructions, which when executed by at least one processor 248, cause the processor(s) 248 to select a cell intended for a UE out of at least a first cell and a second cell. The first cell is unique for a first TRXP. The second cell is a combined cell of the first TRXP and at least one neighbouring, second TRXP. The instructions, when executed by at least one processor 248, further cause the processor(s) 248 to assign the selected cell to the UE.

By way of example, the software or computer program 230; 239 may be realized as a computer program product, which is normally carried or stored on a computer-readable medium 255; 259, in particular a non-volatile medium.

Figure 17:
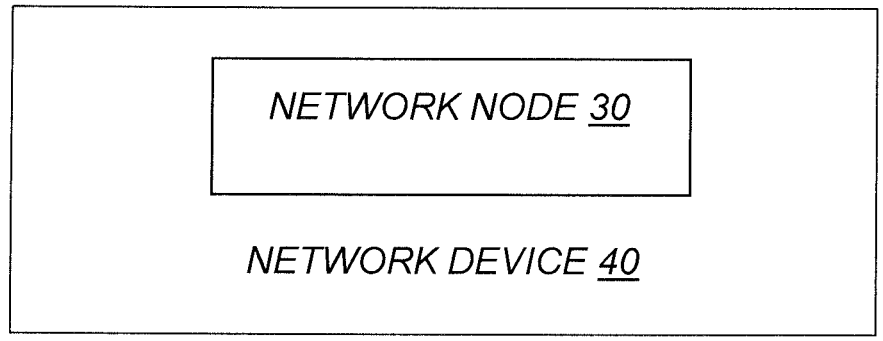
FIG. 17 is a schematic block diagram illustrating an embodiment of a network device.

FIG. 17 is a schematic block diagram illustrating an example of a network device (ND) 40 comprising a network node 30 according to any of the embodiments.

According to an aspect, there is provided a network device 40 comprising a network node 30 as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

According to another aspect, there is provided a communication unit 10 in a wireless communication system, wherein the communication unit 10 comprises a network node 30 as described herein. The communication unit may be any suitable communication unit in the wireless communication system. By way of example, the communication unit may be a wireless communication device such as a UE, STA or similar end-user device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 18:
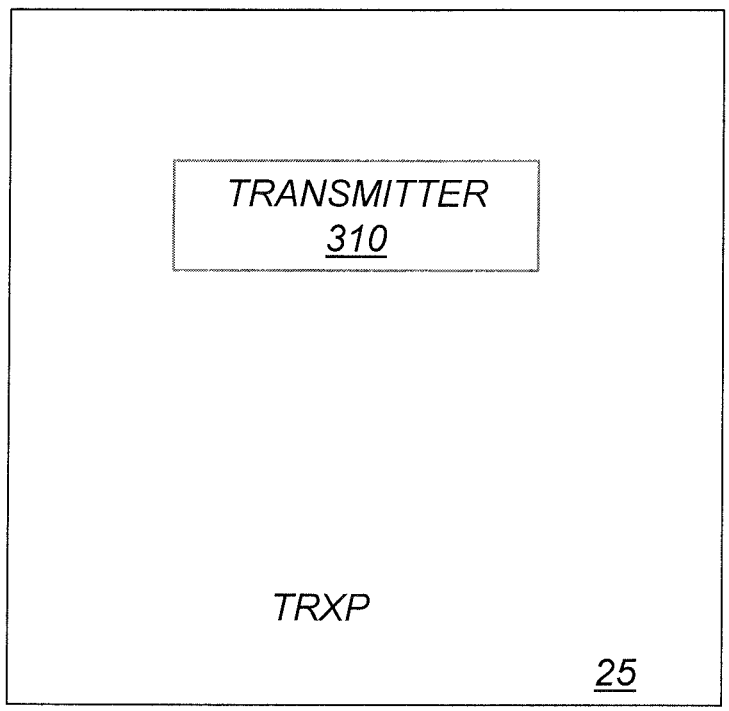
FIG. 18 is a schematic diagram illustrating an embodiment of a TRXP.

FIG. 18 is a schematic diagram illustrating an example of a TRXP 25 for arranging transmission of synchronization signal blocks. The TRXP 25 comprises a transmitter 310. The transmitter 310 is configured for transmitting first synchronization signal blocks at a carrier and for transmitting second synchronization signal blocks at the carrier. The first synchronization signal blocks define a first cell. The first cell is unique for the TRXP. The second synchronization signal blocks define a second cell. The second cell is a combined cell of the TRXP and at least one neighbouring, second TRXP.

Figure 19:
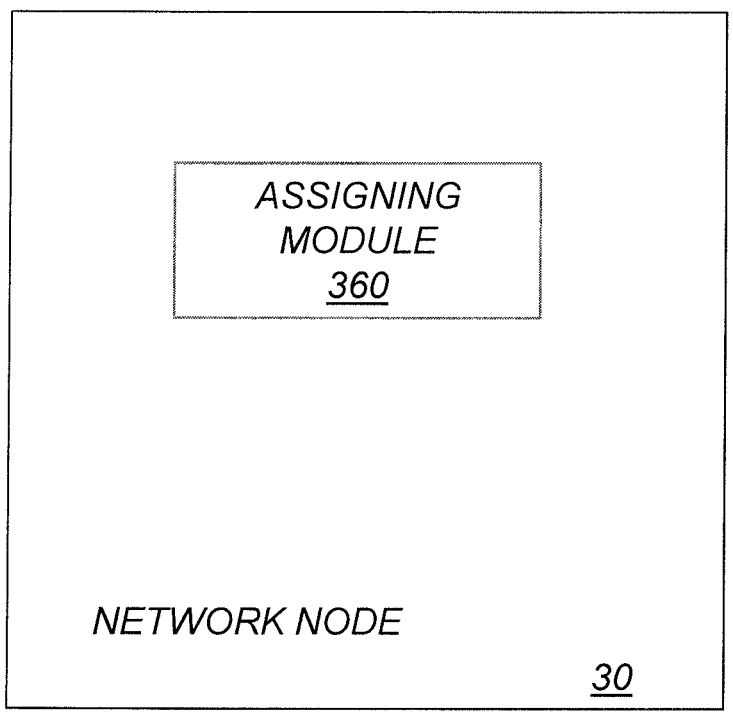
FIG. 19 is a schematic diagram illustrating an embodiment of a network node.

FIG. 19 is a schematic diagram illustrating an example of a network node 30 for cell assignment. The network node 30 comprises an assigning module 360, for selecting a cell intended for a UE out of at least a first cell and a second cell, and for assigning the selected cell to the UE. The first cell is unique for a first TRXP. The second cell is a combined cell of the first TRXP and at least one neighbouring, second TRXP.

Alternatively, it is possible to realize the module(s) in FIGS. 18 and 19 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often be desirable to centralize functionality in so-called generic data centres, in other scenarios it may in fact be beneficial to distribute functionality over different parts of the network.

Figure 20:
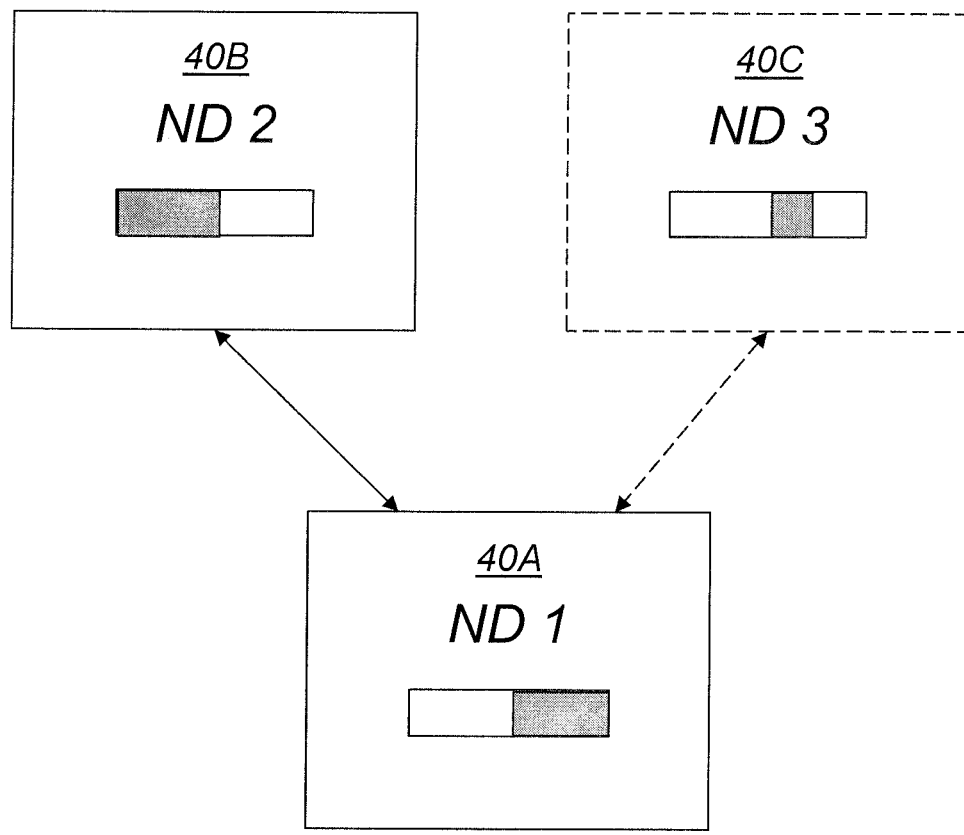
FIG. 20 is a schematic diagram illustrating a general example of functionality distribution or partition.

FIG. 20 is a schematic diagram illustrating an example of how functionality can be distributed or partitioned between different Network Devices (ND) in a general case. In this example, there are at least two individual, but interconnected network devices, ND 1 and ND 2, with reference numerals 40A and 40B, respectively, which may have different functionalities, or parts of the same functionality, partitioned between the network devices 40A and 40B. There may be additional network devices, such as ND 3, with reference numeral 40C, being part of such a distributed implementation. The network devices 40A-C may be part of the same wireless communication system, or one or more of the network devices may be so-called cloud-based network devices located outside of the wireless communication system.

Figure 21:
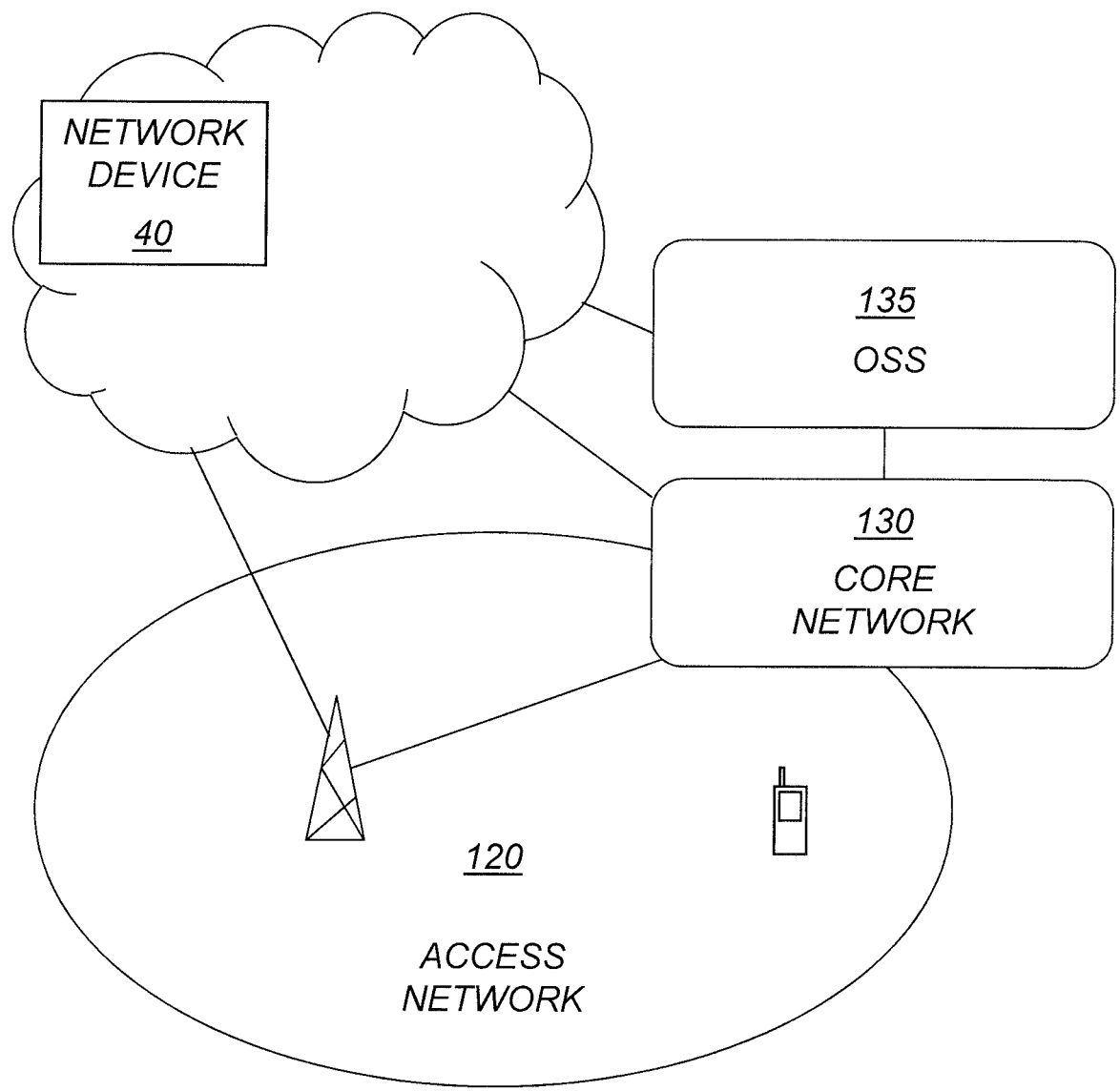
FIG. 21 is a schematic diagram illustrating an example of a wireless communication system in cooperation with one or more cloud-based network devices.

FIG. 21 is a schematic diagram illustrating an example of a wireless communication system, including an access network 120 and/or a core network 130 and/or an Operations and Support System (OSS), 135 in cooperation with one or more cloud-based network devices 40. Functionality relevant for the access network 120 and/or the core network 130 and/or the OSS system 135 may be at least partially implemented for execution in a cloud-based network device 40, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general-purpose network device, or a hybrid thereof.

A special-purpose network device may use custom processing circuits and a proprietary operating system (OS), for execution of software to provide one or more of the features or functions disclosed herein.

A general-purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general-purpose network device may for example include hardware comprising a set of one or more processor(s), often COTS processors, and network interface controller(s) (NICs), as well as non-transitory machine-readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV). Thus, NFV may be used to consolidate many network equipment types onto industry standard high-volume server hardware, physical switches, and physical storage, which could be located in data centres, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a ND. In certain embodiments of such a hybrid network device, a platform Virtual Machine (VM), such as a VM that implements functionality of a special-purpose network device, could provide for para-virtualization to the hardware present in the hybrid network device.

The SSB arrangement described here allows the NW to get the UE support for using TRXPs for SFN combined transmission and reception as well as in a legacy way where each TRXP SSB transmission represents an individual Cell to the UE's.

SSB transmission to representing individual cells support RRC idle/inactive mode cell reselection and can be used in a capacity efficient way to boost some data connections to the RRC connected UE's.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

2G $2^{nd}$ generation
3GPP $3^{rd}$ generation Partnership Project
4G 4th generation
5GC Core of the 5th Generation
AMF/UPF Access Management Function/User Plane Function
ASIC Application Specific Integrated Circuits
BTS Base Transceiver Stations
CD Compact Disc
COTS Common Off-The-Shelf
CPE Customer Premises Equipment
CPU Central Processing Units
DC/CA Dual Connectivity/Carrier Aggregation
DL DownLink
DSP Digital Signal Processors
DVD Digital Versatile Disc
eNB evolved Node B
FPGA Field Programmable Gate Arrays
HDD Hard Disk Drive
HW hardware
I/O input/output
LEE Laptop Embedded Equipment
LME Laptop Mounted Equipment
LTE Long-Term Evolution
MBMS Multimedia broadcast/multicast service
MEM memory units
MIB Master Information Block
NB Node B
ND Network Device
NFV Network Function Virtualization
NG-RAN New Generation Radio Access Network
NI Network Interfaces
NIC Network Interface Controller
NR New Radio NW Network
OFDMA Orthogonal frequency-division multiple access
OS Operating System
OSS Operations and Support System
PBCH Physical Broadcast CHannel
PC Personal Computer
PCell Primary Cell
PCI Physical Cell Identity
PDA Personal Digital Assistant
PLC Programmable Logic Controllers
PRB Physical Resource Block
PSS Primary Synchronization Signal
RACH Random Access Channel
RAM Random Access Memory
RE Resource Element
REG registers
RMSI ReMaining System Information
ROM Read-Only Memory
RRC Radio Resource Control
RRU Remote Radio Units
SC SubCarrier
SCS SubCarrier Spacing
SFN Single Frequency Network
SSB Synchronization Signal Block
SSS Secondary Synchronization Signal
STA Station
SW software
TRXP Transmission/Reception Point
UE User Equipment
USB Universal Serial Bus
VM Virtual Machine
VMM Virtual Machine Monitor
VNE Virtual Network Element
WNIC Wireless Network Interface Controller

The invention claimed is:

1. A method for arranging transmission of synchronization signal blocks, the method comprising:
   transmitting, from a first transmission/reception point of a cellular telecommunication system, first synchronization signal blocks at a carrier; the first synchronization signal blocks defining a first cell, the first cell being unique for the first transmission/reception point;
   transmitting, from the first transmission/reception point, second synchronization signal blocks at the carrier; the second synchronization signal blocks defining a second cell, the second cell being a combined cell of the first transmission/reception point and at least one neighboring, second transmission/reception point;
   wherein the combined cell is defined in that at least two transmission/reception points transmit identical synchronization signal blocks at a same time and frequency so that a user equipment perceives it to represent a same synchronization signal block.

2. The method of claim 1:
   wherein the first synchronization signal blocks comprise a physical cell identity of the first cell; and
   wherein the second synchronization signal blocks comprise a physical cell identity of the second cell.

3. The method of claim 2, wherein synchronization signal blocks defining the second cell transmitted from different transmission/reception points comprises the same physical cell identity of the second cell.

4. The method of claim 2, wherein the physical cell identity comprises a primary synchronization signal and a secondary synchronization signal.

5. The method of claim 1, wherein the first synchronization signal blocks and the second synchronization signal blocks are provided concurrently and/or interleaved in time.

6. The method of claim 1, wherein at least one of the first synchronization signal blocks and at least one of the second synchronization signal blocks are superimposed on top of each other, using a same resource element.

7. The method of claim 1, wherein the first synchronization signal blocks are provided at a different frequency compared to the second synchronization signal blocks.

8. The method of claim 7, wherein the first synchronization signal blocks are provided at a different time slot compared to the second synchronization signal blocks.

9. The method of claim 1, wherein the first synchronization signal blocks are provided at a different time slot compared to the second synchronization signal blocks.

10. The method of claim 1, wherein a time between two consecutive the first synchronization signal blocks is different from a time between two consecutive the second synchronization signal blocks.

11. The method of claim 1, wherein a time between two consecutive the first synchronization signal blocks is the same as a time between two consecutive the second synchronization signal blocks.

12. The method of claim 1:
    wherein the method comprises receiving synchronization signal block configuration data from a new generation radio access network (NG-RAN) node defining the first and second synchronization signal blocks; and
    wherein the transmitting of the first synchronization signal blocks and the transmitting of the second synchronization signal blocks are performed according to the received synchronization signal block configuration data.

13. The method of claim 1, wherein the method comprises transmitting, from the first transmission/reception point, additional synchronization signal blocks at the carrier; the additional synchronization signal blocks defining at least one additional cell; the at least one additional cell being a combined cell of the first transmission/reception point and at least one neighboring, additional transmission/reception point; where the additional transmission/reception point is different from the second transmission/reception point.

14. A transmission/reception point configured to arrange transmission of synchronization signal blocks, the transmission/reception point comprises:
    processing circuitry;
    memory containing instructions executable by the processing circuitry whereby the transmission/reception point is operative to:
       transmit first synchronization signal blocks at a carrier; the first synchronization signal blocks defining a first cell, the first cell being unique for the transmission/reception point;
       transmit second synchronization signal blocks at the carrier; the second synchronization signal blocks defining a second cell, the second cell being a combined cell of the transmission/reception point and at least one neighboring, second transmission/reception point;
       wherein the combined cell is defined in that at least two transmission/reception points transmit identical synchronization signal blocks at a same time and frequency so that a user equipment perceives it to represent a same synchronization signal block.

15. The transmission/reception point of claim 14, wherein the first synchronization signal blocks comprise a physical cell identity of the first cell and the second synchronization signal blocks comprise a physical cell identity of the second cell.

16. The transmission/reception point of claim 15, wherein synchronization signal blocks defining the second cell transmitted from different transmission/reception points comprises the same physical cell identity of the second cell.

17. The transmission/reception point of claim 15, wherein the physical cell identity comprises a primary synchronization signal and a secondary synchronization signal.

18. The transmission/reception point of claim 14, wherein the instructions are such that the transmission/reception point is operative to provide the first synchronization signal blocks and the second synchronization signal blocks concurrently and/or interleaved in time.

19. The transmission/reception point of claim 14, wherein the instructions are such that the transmission/reception point is operative to superimpose at least one of the first synchronization signal blocks and at least one of the second synchronization signal blocks on top of each other, using a same resource element.

20. A non-transitory computer readable recording medium storing a computer program product for controlling a transmission/reception point configured to arrange transmission of synchronization signal blocks, the computer program product comprising program instructions which, when run on processing circuitry of the transmission/reception point, causes the transmission/reception point to:
  transmit first synchronization signal blocks at a carrier; the first synchronization signal blocks defining a first cell, the first cell being unique for the transmission/reception point;
  transmit second synchronization signal blocks at the carrier; the second synchronization signal blocks defining a second cell, the second cell being a combined cell of the transmission/reception point and at least one neighboring, second transmission/reception point;
  wherein the combined cell is defined in that at least two transmission/reception points transmit identical synchronization signal blocks at a same time and frequency so that a user equipment perceives it to represent a same synchronization signal block.

* * * * *